March 13, 1956 W. W. PAGET 2,737,839
TONGS FOR COUPLING AND UNCOUPLING DRILL PIPE JOINTS
Filed June 2, 1952 4 Sheets-Sheet 1

INVENTOR:
WIN W. PAGET
BY Charles F. Osgood
ATTORNEY

March 13, 1956 W. W. PAGET 2,737,839
TONGS FOR COUPLING AND UNCOUPLING DRILL PIPE JOINTS
Filed June 2, 1952 4 Sheets-Sheet 2
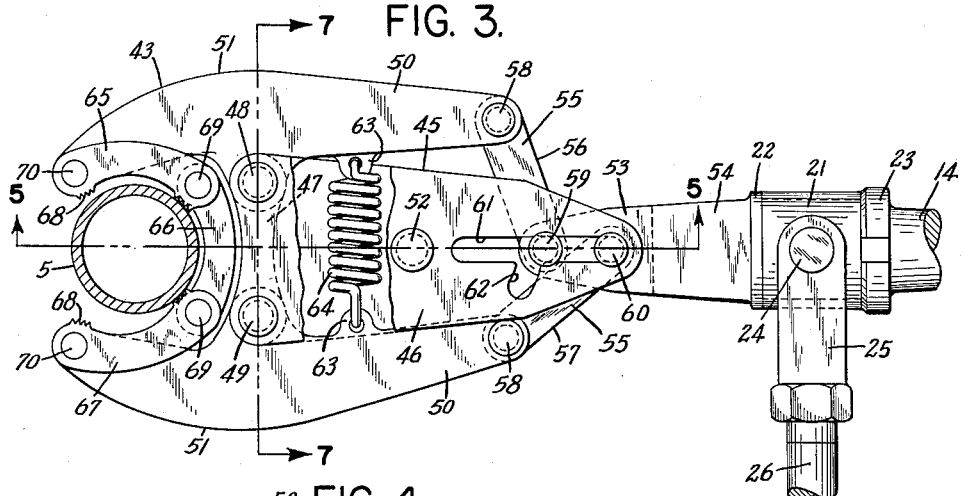
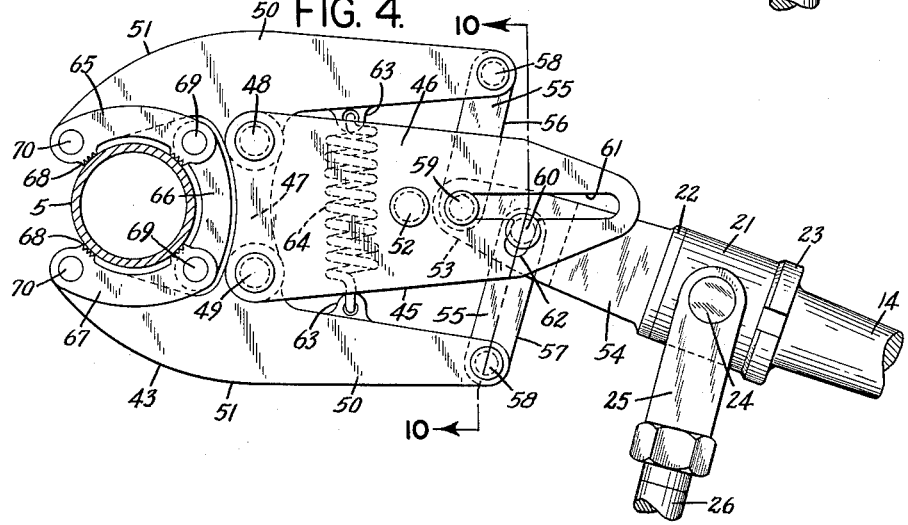
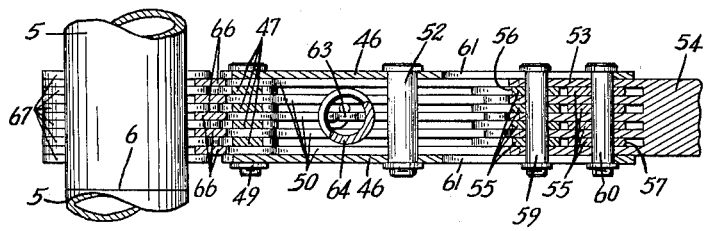
INVENTOR:
WIN W. PAGET
BY *Charles F. Osgood*,
ATTORNEY March 13, 1956 W. W. PAGET 2,737,839
TONGS FOR COUPLING AND UNCOUPLING DRILL PIPE JOINTS
Filed June 2, 1952 4 Sheets-Sheet 3
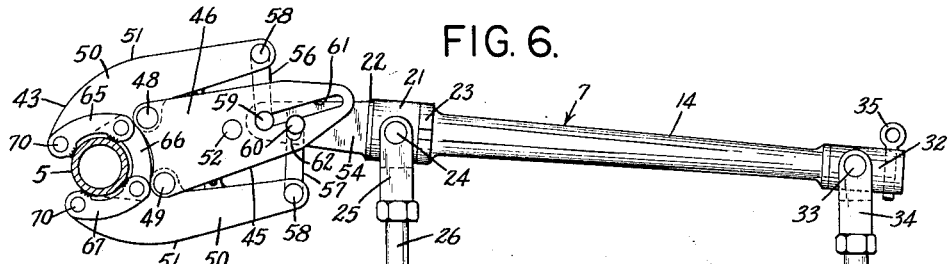
FIG. 6.
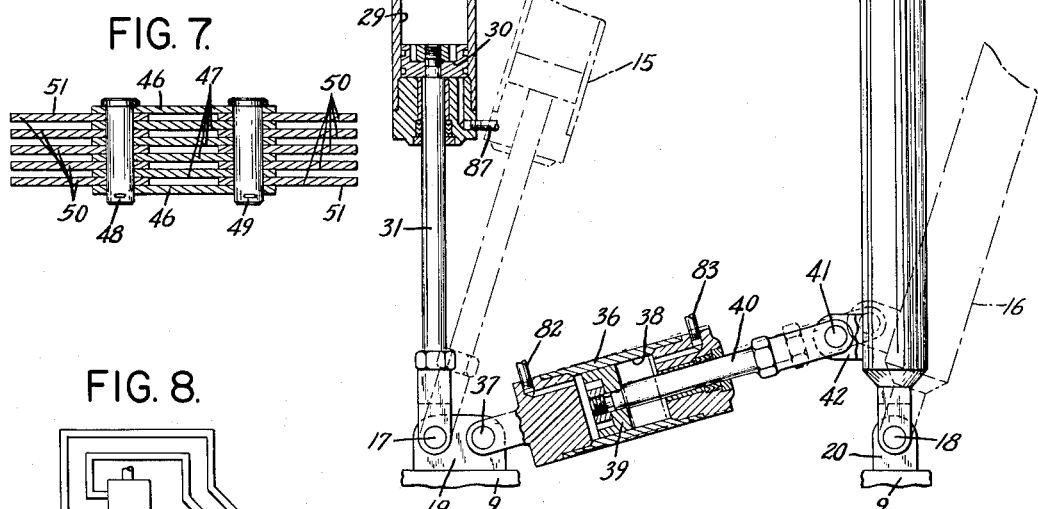
FIG. 7.
FIG. 8.
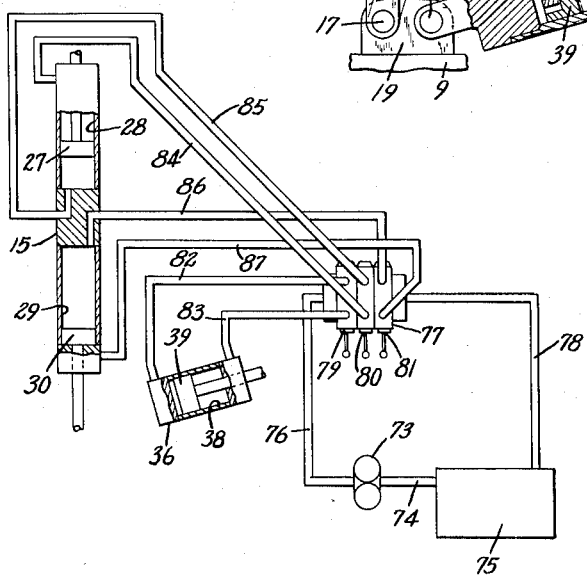
INVENTOR:
WIN W. PAGET
BY
Charles F. Osgood,
ATTORNEY March 13, 1956 W. W. PAGET 2,737,839
TONGS FOR COUPLING AND UNCOUPLING DRILL PIPE JOINTS
Filed June 2, 1952 4 Sheets-Sheet 4

INVENTOR:
WIN W. PAGET
BY Charles F. Osgood
ATTORNEY

United States Patent Office 2,737,839
Patented Mar. 13, 1956

2,737,839

TONGS FOR COUPLING AND UNCOUPLING DRILL PIPE JOINTS

Win W. Paget, Mountain Brook, Ala., assignor to Joy Manufacturing Company, Pittsburgh, Pa., a corporation of Pennsylvania Application June 2, 1952, Serial No. 291,156

30 Claims. (Cl. 81—53)

This invention relates to oil well drilling equipment and more particularly to "back-up" and "break-out" or "make-up" tongs for coupling and uncoupling the tool joints of a drill pipe employed in the drilling of oil wells.

In oil well drilling equipment the coupling and uncouping or so-called "making" and "breaking" of the tool joints of the drill pipe line is usually effected by pipe gripping tongs, and the lower pipe section is usually gripped and held against rotation by a "back-up" tong and the upper pipe section is usually gripped and rotated by an upper "break-out" or "make-up" tong. After the tool joint is broken, or during coupling of the tool joint, a conventional spinning device may serve rapidly to rotate or spin the upper pipe section in a well-known manner. Thus, during running of the drill pipe out of the hole, the pipe section below the joint to be broken is gripped and held against rotation while the upper pipe section is rotated to loosen the joint, and, conversely, during running of the drill pipe into the hole the upper pipe section is rotated to tighten or "make" the joint while the lower pipe section is gripped and held against rotation, and this latter running-in function is usually accomplished simply by inverting or reversing the upper and lower tongs to effect coupling or "making" of the joints instead of the uncoupling or "breaking" thereof. The present invention contemplates improvements over known types of joint coupling and uncoupling tongs of the character referred to in that the lower pipe section below the joint is gripped and held against rotation and the upper pipe section is rotated by tongs which are positioned and actuated by hydraulic pressure thereby to facilitate the "make-up" and "break-out" operations and to reduce the hazards ofttimes encountered with less efficient equipment.

It is a primary object of the present invention to provide improved tool joint coupling and uncoupling tongs designed for use with oil well drilling equipment. Another object is to provide improved power actuated means for positioning and actuating tongs which are adapted to couple and uncouple the joints of a drill pipe. Yet another object is to provide improved "back-up" and "break-out" tongs which are positioned and actuated hydraulically and which may be inverted in an improved manner to effect a joint "make-up" function during running of the drill pipe into a hole. A further object is to provide an improved oil well drill pipe tong structure having novel features of design. These and other objects and advantages of the invention will, however, hereinafter more fully appear in the course of the ensuing description.

In the accompanying drawings there is shown for purposes of illustration one form which the invention may assume in practice.

In these drawings:

Fig. 3 is an enlarged fragmentary plan view of the pipe gripping mechanism of one of the tongs.

Fig. 4 is a view similar to Fig. 3 with the parts in pipe gripping position.

Fig. 5 is a vertical section taken on line 5—5 of Fig. 3.

Fig. 6 is an enlarged plan view, with parts in horizontal section, showing the lower "back-up" tong.

Fig. 7 is a cross section taken on line 7—7 of Fig. 3.

Fig. 8 is a diagrammatic view of the hydraulic system used with the lower "back-up" tong shown in Fig. 6.

Figure 1:
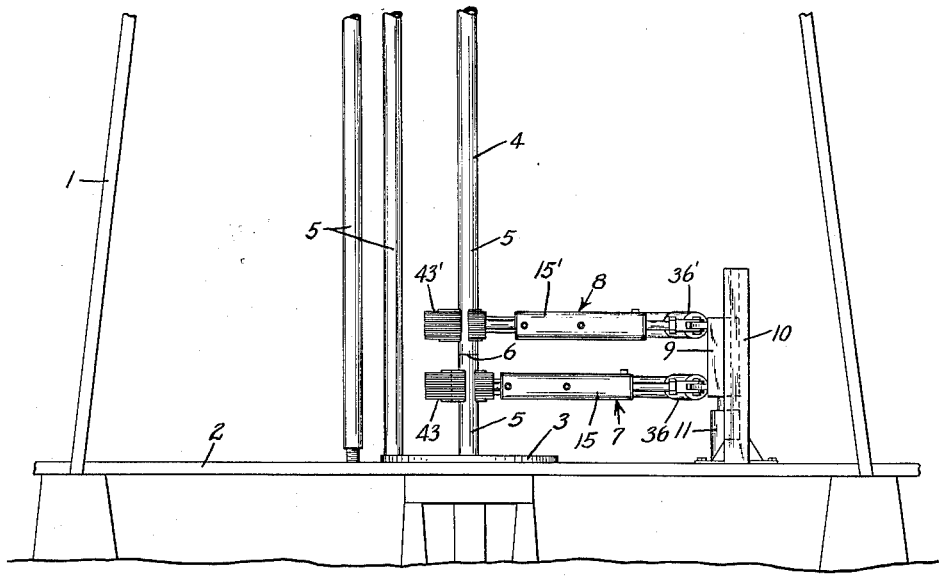
Fig. 1 is a fragmentary side elevational view of an oil well drill rig showing the improved tongs in operative relation to a drill pipe line.
Figure 2:
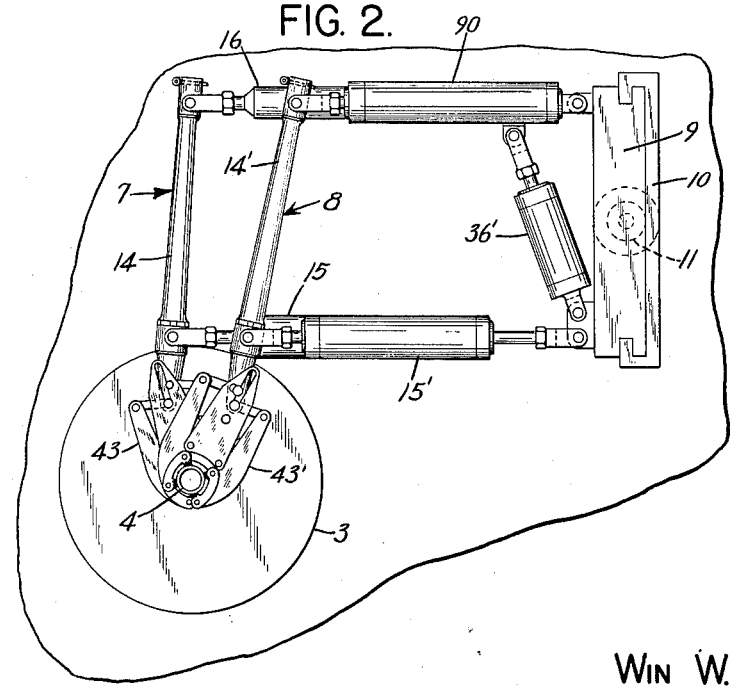
Fig. 2 is a plan view of the drill rig and tongs shown in Fig. 1.
Figure 10:
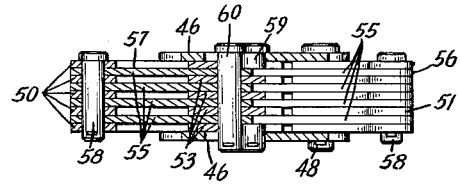
Fig. 10 is a cross section taken on line 10—10 of Fig. 4.

In Figs. 1 and 2 there is shown an oil well drill rig including a conventional derrick mast 1, a derrick floor 2, a rotary table 3 and a drill pipe line 4. The drill pipe line consists of drill pipe sections 5 coupled together by tool joints 6, the latter each usually comprising a box formed with a threaded socket for receiving a threaded pin, and the box is usually located at the upper end of each pipe section while the pin is usually located at the lower end of each section, in a well-known manner. The rotary table usually embodies pipe rotating means whereby the pipe may be rotated as it passes through the table during the drilling operation, and gripping means are usually provided for holding the lower portion of the pipe line against downward movement during coupling or uncoupling of the tool joints. The drill pipe line is usually lowered in and raised from the hole by the hoisting cable of a conventional draw works, with the dropline-hook of the cable attached to a conventional swivel at the upper end of a kelly attached to the pipe line. Since a drill rig of the character above outlined is well-known and does not per se enter into the present invention, further description thereof is herein unnecessary.

Now referring to the improved tong structure, it will be noted that a lower "back-up" tong, generally designated 7, and an upper "break-out" or "make-up" tong, generally designated 8, are arranged in superimposed horizontal relation, as shown in Fig. 1, and are carried by a conventional vertical slide 9 suitably guided for vertical adjustment along the guideways of a supporting frame or pedestal 10 carried at one side of the derrick floor in the manner shown. A vertical hydraulic cylinder device or jack 11 arranged within the pedestal serves to raise and lower the slide 9 to vary the elevation of the tongs to enable positioning thereof in a suitable manner with respect to a drill pipe joint 6, and by trapping liquid in this jack the slide may be firmly held in adjusted position.

The lower "back-up" tong 7 serves to grip the lower pipe section to hold the same against rotation during the "break-out" and "make-up" operations and comprises an elongated horizontal lever arm 14 (Fig. 6) which is rotatably and pivotally mounted on an extensible link member, herein a compound hydraulic cylinder and piston device 15 and a link member herein in the form of an elongated strut member 16 arranged at times in substantial parallelism with the cylinder device. The cylinder and piston device 15 and the strut member 16 are pivotally supported at their outer ends on parallel vertical axes at 17 and 18 respectively, on brackets 19 and 20 secured to the vertical slide 9. The inner portion of the lever arm 14 is rotatably mounted to turn about its longitudinal axis in a sleeve 21 arranged between a circular flange 22 and a threaded collar 23 and pivotally connected at 24 on a right angle axis to a yoke 25. This yoke is secured to the outer end of a piston rod 26 of a piston 27 reciprocably mounted in a cylinder bore 28 within the cylinder device 15. Aligned axially with the cylinder bore 28 is a cylinder bore 29 containing a piston 30 having its piston rod 31 projecting from the cylinder oppositely from the piston rod 26 and at its outer end providing the pivotal connection 17 with the bracket 19. The lever arm 14 at its outer end is rotatably mounted in a sleeve 32 which cooperates with the sleeve 21 in providing the rotatable mounting for the lever arm, and this sleeve is pivotally connected at 33 on a right angle axis to a yoke 34 secured to the adjacent end of the strut member 16. The lever arm 14 of the lower tong may be turned about its longitudinal axis into either of its inverted positions to enable operation thereof in reverse directions, as later explained, and a releasable pin 35 serves to lock the lever arm in either position.

In this novel construction, extending between the bracket 19 and the strut member 16 near the pivoted end of the latter is a cylinder device 36 pivotally connected at 37 to the bracket 19 and reciprocable in a cylinder bore 38 is a piston 39 having its piston rod 40 pivotally connected at 41 to a lateral lug 42 integral with the strut member 16. By properly supplying liquid under pressure to the cylinder bore 38 the piston 39 may be moved to effect swinging of the then parallel strut member 16 and cylinder device 15 in horizontal planes about the pivots 17 and 18 thereby to move the lever arm horizontally through an arcuate path in a generally endwise direction to bring the inner gripping mechanism 43 of the tong 7 into and out of gripping relation with respect to the drill pipe, and by trapping liquid within the cylinder bore 38 the gripping mechanism of the tong may be held in pipe-engaging relation.

The gripping mechanism 43 of the lower tong 7 has a horizontal central body or frame 45 of laminated construction comprising horizontal top and bottom plates 46, and stacked in horizontal superimposed relation between the plates 46 at the inner end of the body or frame are spaced apart horizontal connecting links 47 which carry parallel vertical pivot pins 48 and 49, and projecting between the plates 46 and the links 47 are superimposed horizontal plates 50 which cooperate to provide laminated levers 51 pivotally mounted on the pivot pins 48 and 49 respectively at the opposite sides of the central body 45. Also passing through the top and bottom plates 46 is a securing pin 52 which cooperates with the pins 48 and 49 in the holding of the plates together. Also projecting alternately between horizontal platelike projections 53 integral with an inner end projection 54 of the lever arm 14, are superimposed spaced apart plates 55 which cooperate to provide laminated toggle links 56 and 57. Carried at the outer ends of the levers 51 are vertical pins 58 to which the remote ends of the toggle links 56 and 57 are pivotally connected, and the inner ends of these toggle links are connected to parallel vertical pins 59 and 60 carried by the platelike projections 53 of the lever arm 14 and these pins are slidable in longitudinal slots 61 in the plates 46 of the central body. Lateral notches 62 enter the longitudinal slots 61 close to a point midway between the ends of the longitudinal slots (Figs. 3 and 4), and the pin 60 is adapted to enter these lateral notches when the pin 59 reaches the inner ends of the longitudinal slots and the lever arm is swung, as shown in Fig. 4. Connected between eyes 63 formed on the inner edges of the center plates of the levers 51 is a coil spring 64 housed within the body 45 and which constantly urges the levers 51 about their pivots with their inner ends in wide open position. The gripping jaws are also of laminated construction and comprise three sets of superimposed segmental plates 65, 66 and 67 and the two sets 65 and 67 are formed with suitable gripping teeth 68. The intermediate set of gripping plates 66 are pivotally connected by pivot pins 69 to the plates 65 and 67 and these latter plates are pivotally connected by pins 70 to the inner ends of the levers 51 remote from the pivotal connection of the latter with the toggle links. When the lever arm 14 is advanced endwise toward the drill pipe line, in a manner to be later explained, the gripping mechanism 43 is brought into gripping position with respect to the drill pipe, as shown in Fig. 3, and as the lever arm continues to advance relative to the body 46, the toggle links 56 and 57 effect horizontal swinging of the levers 51 about their pivots to bring the sets of segmental gripping plates into gripping relation with the drill pipe, as shown in Fig. 4. When the pin 59 reaches the inner ends of the longitudinal slots 61, as shown in Fig. 4, the lever arm 14 may be swung horizontally to bring the pin 60 into the lateral notches 62 thereby further to increase the gripping action of the gripping jaws on the drill pipe.

Fig. 8 shows diagrammatically a hydraulic system associated with the lower tong 7 shown in Fig. 6. A conventional liquid pump 73 has its suction side connected by conduit 74 to a liquid tank 75 and the discharge side of the pump is connected by a conduit 76 to the pressure passage of a valve box 77 of a conventional control valve mechanism. The discharge passage of the valve box is connected by conduit 78 back to the tank. The valve box has parallel bores containing valves 79, 80 and 81 which may be of the conventional balanced-spool, slide type, each having a suitable operating handle. The bore containing the valve 79 is connected by conduits 82 and 83 to the opposite ends of the cylinder bore 38 of the cylinder and piston device 36, while the bore containing the valve 80 is connected by conduits 84 and 85 to the opposite ends of the cylinder bore 28 of the cylinder and piston device 15. The bore containing the valve 81 is connected by conduits 86 and 87 to the opposite ends of the alined cylinder bore 29 of the device 15.

During running of the drill pipe line out of the hole the gripping mechanism 43 of the lower "back-up" tong may be moved into gripping relation with the drill pipe (see Fig. 3) by supplying liquid under pressure through the conduit 83 of the swing cylinder device 36 to move the piston 39 to swing the then parallel supporting device 15 and strut member 16 horizontally about their pivots thereby to advance the lever arm 14 through a horizontal arcuate path in a generally endwise direction. During such movement of the lower tong, liquid under pressure is supplied through conduits 84 and 86 (Fig. 6) to move the pistons 27 and 30 to the ends of their respective bores 28 and 29 (downwardly as viewed in Fig. 6), thereby to maintain the device 15 axially rigid, and of the same overall length as and in parallelism with, the strut member 16. When the gripping mechanism assumes the position shown in Fig. 3 with the gripping plates contacting the drill pipe, continued pressure exerted on the piston 39 of the swing device 36 continues to advance the lever arm 14 endwise relative to the gripping mechanism to cause movement of the lever arm with respect to the body 46 thereof to effect swinging of the levers 51 to bring the gripping plates into gripping engagement with the lower drill pipe section. Thereafter liquid under pressure may be supplied through conduit 85 to the bore 28 of the cylinder and piston device 15 to move the piston 27 outwardly (upwardly as viewed in Fig. 6) to effect swinging of the lever arm 14 about the pivot 33 to the position shown in Fig. 6 to effect firm gripping of the drill pipe section. When the gripping mechanism 43 is inverted from its position shown in Fig. 6 to effect reverse gripping of the drill pipe section during running of the pipe line into the hole, the lever arm 14 is swung about its pivot 33 in a direction opposite from that shown in Fig. 6 to effect firm gripping of the pipe by supplying liquid under pressure to the conduits 84 and 87.

Figure 9:
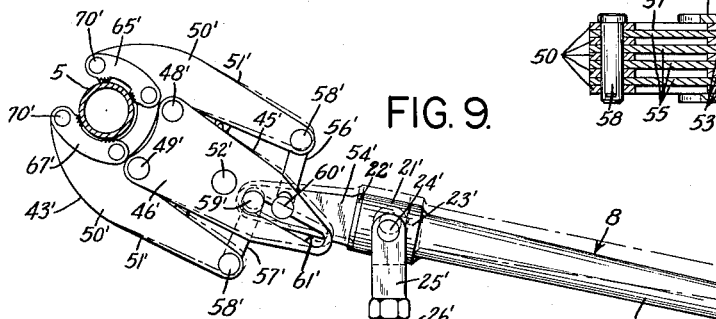
Fig. 9 is an enlarged plan view, with parts in horizontal section, illustrating the upper "break-out" or "make-up" tong.

Now referring to the specific structure of the upper "break-out" or "make-up" tong 8 shown in Fig. 9, it will be noted that a horizontal lever arm 14′, similar to the lever arm 14 of the lower tong, is rotatably and pivotally mounted on a compound cylinder and piston device 15′ similar to the device 15 of the lower tong, and on a single, double acting, hydraulic cylinder and piston device 90 which replaces the rigid strut 16 of the lower tong. The cylinder and piston devices 15' and 90 are at times disposed in substantial parallelism and are pivotally mounted at 17' and 18' on parallel vertical axes on brackets 19' and 20' carried by the vertical slide 9. Also connected between the bracket 19' and the device 90 is a hydraulic cylinder and piston device 36' similar to the device 36 of the lower tong. The lever arm 14' is rotatably mounted to turn about its longitudinal axis in sleeves 21' and 32' pivotally connected on right angle axes to yokes 25' and 34' respectively, and these yokes are respectively secured to a piston rod 26' of the device 15' and to the adjacent end of the device 90. The device 90 comprises a horizontal cylinder 91 having a bore 92 containing a reciprocable piston 93 having a piston rod 94 which is secured at its outer end to the yoke 34'. As in the lower tong above described, when liquid under pressure is properly supplied to the cylinder bore of the device 36', the devices 15' and 90 may be swung horizontally about their pivots 17' and 18' to move the gripping mechanism 43' of the upper tong into gripping relation with the drill pipe, and this gripping mechanism may be identical to that of the lower tong and may include similar parts designated by similar but primed reference numerals. As in the lower tong above described, when the lever arm 14' is advanced in a generally endwise direction toward the drill pipe, with the devices 15' and 90 in parallelism, it first assumes its gripping position with respect to the pipe, as shown in Fig. 3, and upon continued advance relative to the body of the gripping mechanism the gripping levers 51' are swung horizontally about their pivots to effect gripping of the pipe and finally, when the lever is swung further, gripping pressure is applied to the pipe and the upper pipe section is rotated to break the joint.

Figure 11:
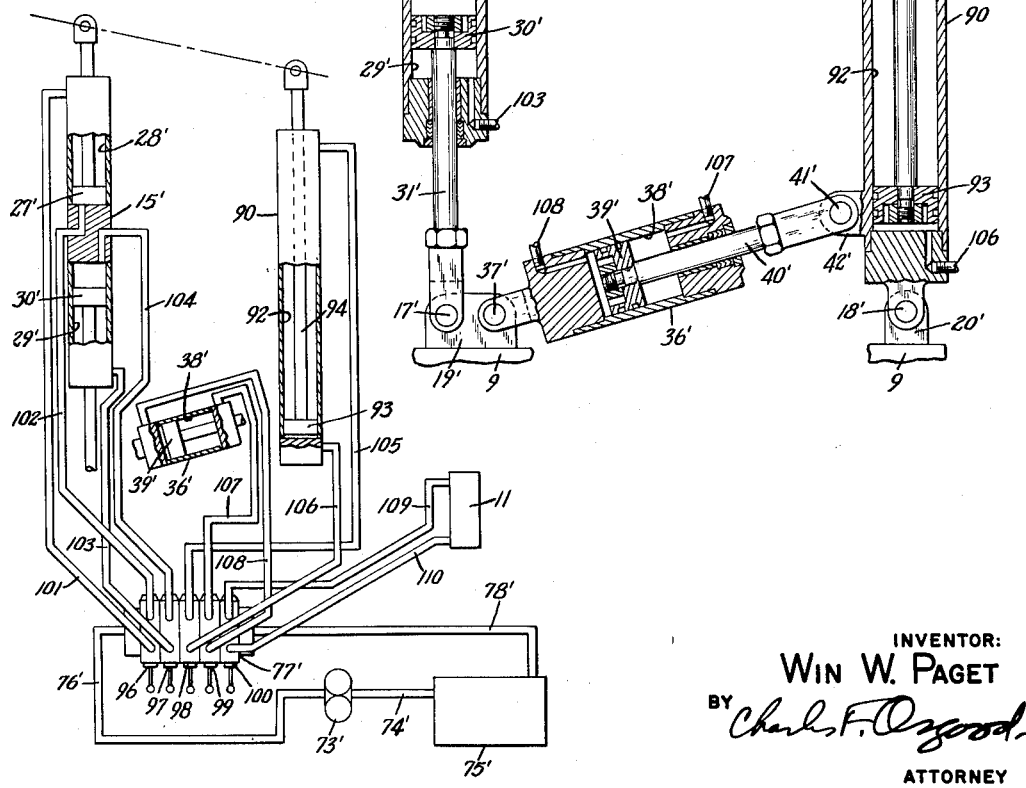
Fig. 11 is a diagrammatic view of the hydraulic system used with the upper tong shown in Fig. 9.

The hydraulic system associated with the upper tong shown in Fig. 9, is illustrated diagrammatically in Fig. 11 and comprises pump 73' having its suction side connected to a liquid tank 75' and its discharge side connected to a valve box 77' of a conventional control valve mechanism in the manner of the hydraulic system shown in Fig. 8 and described above. If desired, the pumps 73 and 73' shown in Figs. 8 and 11 may constitute a unitary dual pump with both pump elements connected to a common liquid tank and to a common discharge passage. The valve box has parallel bores containing valves 96, 97, 98, 99 and 100 similar to the valves 79, 80 and 81 and likewise each having a suitable control handle. The bore containing the slide valve 96 is connected by conduits 101 and 102 to the opposite ends of the cylinder bore 28' of the cylinder and piston device 15', while the bore containing the slide valve 97 is connected by conduits 103 and 104 to the opposite ends of the bore 29' of the device 15'. The bore containing the slide valve 98 is connected by conduits 105 and 106 to the opposite ends of the bore 92 of the cylinder and piston device 90, while the bore containing the slide valve 99 is connected by conduits 107 and 108 to the opposite ends of the cylinder bore 38' of the cylinder and piston device 36'. The bore containing the slide valve 100 is connected by conduits 109 and 110 to the opposite ends of the cylinder of the elevating jack 11. Evidently, the valve boxes 77 and 77', shown in Figs. 8 and 11, may be embodied in a single unitary control valve mechanism.

During running of the pipe line out of the hole, the gripping mechanism 43' of the upper tong may be moved into gripping relation with the drill pipe by supplying liquid under pressure through the conduit 107 to act on the piston 39' of the swing device 36' (Fig. 9) to swing the devices 15' and 90 horizontally about their pivots thereby to move the lever arm 14' arcuately in a generally endwise direction. When the gripping mechanism assumes the position shown in Fig. 3, continued endwise advance of the lever arm 14' relative to the gripping mechanism effects gripping engagement of the gripping plates with the upper drill pipe section. Liquid under pressure may then be supplied through conduit 101 to the cylinder bore 28' of the cylinder and piston device 15' to move the piston 27' to effect swinging of the lever arm 14' about its pivot 33' into the full line position shown in Fig. 9 thereby to effect firm gripping of the drill pipe section. Liquid under pressure may then be supplied through conduit 106 to act on the piston 93 of the cylinder and piston device 90 to swing the lever arm 14' and the gripping mechanism 43' thereby to rotate the upper pipe section to effect "breaking" of the joint, and during this operation liquid is forced out of the cylindrical bore 29' through conduit 103, and even out of the cylinder bore 28' through conduit 101, thus to enable lengthening of the device 15' as the lever arm is swung during the "breaking" operation. This would occur, of course, even if equal hydraulic pressures were supplied to all three conduits 106, 101 and 103 due to the difference in mechanical leverage. Conversely, during running of the pipe line into the hole, the gripping mechanism 43' is inverted and moved into gripping relation with the drill pipe by supplying liquid under pressure through conduit 107 to the swing device 36' to effect swinging of the devices 15' and 90 horizontally about their pivots to move the lever 14' arcuately in a generally endwise direction, and when the gripping elements contact the pipe further endwise movement of the lever arm relative to the gripping mechanism effects movement of the gripping elements into gripping engagement with the pipe. After engagement with the pipe, the supply of liquid under pressure may be shifted from conduit 103 to conduit 104 to swing the lever arm 14', relative to the body of the gripping mechanism 43' to effect firm gripping engagement of the gripping elements with the upper pipe section, and then liquid under pressure may be supplied through conduit 105 (it being understood that the device 90 is extended for its full length at that time) to effect movement of the piston 93 (downwardly as viewed in Fig. 9) thereby to rotate the upper pipe section to couple or "make" the tool joint. During the swinging motion of the lever arm 14' during the actual tightening of the tool joint, some liquid may be forced from the bores 28' and 29' through conduits 102 and 104, to permit shortening of the device 15'.

The general mode of operation of the improved tong structure above described is as follows: During running of the drill pipe line out of the hole, the pipe sections are uncoupled at certain of the tool joints, and to effect this operation, liquid under pressure may be first supplied to the cylinder of the elevating jack 11 to adjust the slide 9 vertically thereby to locate the upper and lower tongs in proper relation to the tool joint 6 to be broken, as shown in Fig. 1, and thereafter liquid may be trapped in the jack cylinder firmly to hold the tongs at the proper elevation. Liquid under pressure may then be properly supplied to the cylinder and piston device 36 of the lower "back-up" tong to effect swinging of the cylinder and piston device 15 (which is at that time held axially rigid) and the strut member 16 horizontally about their pivots to move the lever arm 14 horizontally arcuately generally in an endwise direction to bring the gripping mechanism 43 into gripping relation with the lower pipe section 5 of the pipe line which is at that time supported against downward movement in the hole by the gripping means of the rotary table 3. When the gripping mechanism 43 assumes the position shown in Fig. 3, liquid under pressure may be supplied (Fig. 6) to the cylinder bore 28 to act on the piston 27 to move the latter to effect swinging of the lever arm 14 horizontally about its outwardly located pivot 33 to swing the gripping mechanism into the position shown in Fig. 4 thereby firmly to grip the drill pipe section (see also Fig. 6). Thus, the lower pipe section 5 of the pipe line below the tool joint, as shown in Fig. 1, is held against rotation.

Liquid under pressure may then be supplied to the cylinder bore of the cylinder and piston device 36' (Fig. 9) to effect swinging of the cylinder and piston devices 15' (the latter being held axially rigid at that time) and 90 horizontally about their pivots to move the lever arm 14' of the upper tong horizontally arcuately in a generally endwise direction to bring the gripping mechanism 43' into gripping relation with the upper pipe section 4 above the tool joint 6. Liquid under pressure may then be supplied to the cylinder bore 92 of the cylinder and piston device 90 to move the piston 93 to effect swinging of the lever arm 14' about its inner pivot 24' to swing the gripping mechanism into the position shown in Fig. 9 to effect firm gripping of the upper pipe section, and upon continued flow of liquid under pressure to the cylinder 92, the piston 93 is moved to swing the lever arm 14' horizontally to effect turning of the upper pipe section relative to the lower section which is held against rotation by the lower tong, thereby to effect breaking of the tool joint. This tool joint breaking operation is repeated until the entire pipe line has been removed from the hole.

During running of the pipe line into the hole the locking pins 35 and 35' of the lower and upper tongs are released and the lever arms 14 and 14' may be rotated about their longitudinal axes within the bearing sleeves of their supporting structures, through 180° into their inverted positions, and thereafter the pins may be reinserted to lock the lever arms in place. Thus, during this running-in operation the gripping tongs are in reversed position and the tongs may be moved into gripping relation with the pipe sections to effect holding of the lower section against rotation while the upper section is rotated either to break or make the joint, in manners similar to those above described.

From the foregoing, it is evident that the upper and lower tongs may be swung horizontally into and out of gripping relation with the drill pipe line by devices actuated by hydraulic pressure and the tongs may be adjusted to grip the pipe line to hold one section and to turn the adjacent section also by hydraulically operated devices. The lower "back-up" tong and the upper "break-out" or "make-up" tong may be readily inverted into reversed positions simply by rotating the lever arms about their longitudinal axes and locking the same in either of their inverted positions. During either running of the pipe line out of the hole or into the hole the lower pipe section below the joint is firmly gripped and held against rotation while the upper pipe section is rotated either to break or make the joint and both after the breaking operation and prior to the making operation the upper pipe section may be rapidly rotated by a conventional spinning device. Other modes of use and advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. A tong for coupling or uncoupling the tool joints of a drill pipe line comprising an elongated horizontal lever arm, and a gripping mechanism mounted at one end of said lever arm comprising a body, a connection between said end of said arm and said body providing for limited movement of said arm relative to said body, levers pivotally mounted at the opposite sides of said body and carrying pipe gripping elements, and means including toggle links connected between said end of said lever arm and said levers and actuated by such movement of said arm relative to said body for effecting swinging of said levers through said toggle links.

2. A tong as set forth in claim 1 wherein said swing-effecting-means for said levers also comprises vertical pins secured to said end of said lever arm and with which said toggle links are pivotally engaged, and a longitudinal slot in said body into which said pins extend to provide for movement of said lever arm generally endwise relative to said body.

3. A tong for gripping a drill pipe comprising a horizontal lever arm, a strut member pivotally mounted to swing in horizontal planes and pivotally connected to said lever arm near one end of the latter, a fluid extensible cylinder and piston device spaced from said strut member and pivoted to swing in horizontal planes and pivotally connected to said lever arm near the opposite end of the latter, said cylinder and piston device and said strut member supporting said lever arm and disposable in parallel relation, said cylinder and piston device being extensible under the action of pressure fluid to move the same out of parallelism with said strut member thereby to swing said lever arm horizontally about its pivotal connection with said strut member, and a pipe gripping device carried by said lever arm at said opposite end of said arm and actuated by said swinging movement of the latter.

4. A tong as set forth in claim 3 wherein spaced bearing supports are provided between said lever arm and said strut member and said device so that said lever arm may be rotated about its longitudinal axis relative to said strut member and said extensible device to invert said gripping mechanism whereby said gripping device may grip the pipe in either of opposite directions, and a locking element for locking said lever arm in either of its inverted positions.

5. A tong for coupling or uncoupling the joints of a drill pipe line, comprising a horizontal lever arm, a pipe gripping mechanism carried by one end of said lever arm, and a pair of extensible supporting devices arranged in spaced apart parallel relation and pivoted to swing horizontally, said supporting devices being pivotally connected to said lever arm at points spaced longitudinally of the latter, said supporting devices having swinging movement relative to said lever arm about said spaced pivotal connections.

6. A tong as set forth in claim 5 wherein one of said supporting devices is extensible by power to move the same out of parallelism with said other supporting device thereby to effect swinging of said lever arm horizontally about its pivotal connection with said other supporting device.

7. A tong as set forth in claim 5 wherein one of said supporting devices is extensible by pressure fluid and includes a cylinder having aligned bores and relatively movable pistons contained in said bores respectively.

8. A tong for coupling and uncoupling the tool joints of a drill pipe line comprising an elongated horizontal lever arm, a gripping mechanism carried by said lever arm at one end of the latter comprising a body, levers pivotally mounted at the opposite sides of said body to swing relative thereto, pipe gripping elements connected to said levers, a lost motion connection between said body and said arm providing for limited movement of said arm relative to said body, and means including toggle links connected between said arm and said levers and actuated by movement of said arm relative to said body for effecting swinging of said levers through said toggle links.

9. A tong as set forth in claim 8 wherein such movement of said lever arm relative to said body for swinging said levers may include both bodily endwise movement and horizontal swinging movement.

10. A tong as set forth in claim 8 wherein a swingable supporting structure is provided for supporting said lever arm for movement generally in an endwise direction for effecting movement of said gripping mechanism horizontally toward and from the drill pipe line.

11. A tong as set forth in claim 10 wherein said lever arm is rotatably mounted at longitudinally spaced points on said swingable supporting structure to turn about the longitudinal axis of said arm to invert said gripping mechanism to effect gripping of the pipe in the reverse direction.

12. A tong as set forth in claim 8 wherein a retracting spring is arranged between said levers for constantly urging said gripping elements toward released position thereby to release said gripping elements from the pipe whenever said lever arm is positioned to release said toggle links.

13. A tong for coupling and uncoupling the tool joints of a drill pipe line comprising a supporting structure including spaced apart horizontal link members disposable in parallel relation, an elongated lever arm supported at spaced points along its length by said link members and pivotally connected to the latter, and a pipe gripping mechanism carried by said lever arm, said link members being pivoted to swing in horizontal planes to move said gripping mechanism arcuately toward and from the drill pipe, and one of said link members being extensible to vary its effective length to move said link members out of parallelism thereby to effect swinging of said lever arm horizontally about its pivotal connection with said other link member.

14. A tong for coupling and uncoupling the tool joints of a drill pipe line comprising an elongated horizontal lever arm, and a gripping mechanism mounted at one end of said lever arm comprising a body, a connection between said end of said arm and said body permitting movement of said arm relative to said body, and levers pivotally mounted at the opposite sides of said body and carrying pipe gripping elements, said connection including toggle links, vertical pins secured to said end of said lever arm and with which said toggle links are pivotally engaged and a longitudinal slot in said body into which said pins extend whereby said lever arm may be moved generally endwise relative to said body, said longitudinal slot having a lateral communicating slot for receiving one of said pins when said other pin engages one end of said longitudinal slot to permit swinging of said lever arm horizontally relative to said body.

15. A tong as set forth in claim 13 wherein said gripping mechanism includes a body and relatively movable gripping means thereon and said body is pivotally connected to said arm, and operative connections are provided between said arm and said gripping means and are actuated by said arm relative to said body for moving said gripping means into gripping relation with the drill pipe whenever said lever arm is swung as aforesaid relative to said body by said extensible link member.

16. In combination, an elongated lever arm, means for mounting said lever arm for swinging movement, a body carried by said lever arm and relative to which the latter is swingable, pipe gripping elements movably mounted on said body, and means associated with said body providing an operative connection between said gripping elements and said lever arm and actuated by swinging movement of the latter for effecting movement of said gripping elements into pipe gripping position whenever said lever arm is swung relative to said body.

17. The combination as set forth in claim 16 wherein said operative connection between said lever arm and said gripping elements includes a guide slot in said body, toggle links operatively connected at one end to said arm for operating said gripping elements operatively connected to the latter, said arm at one end having guided engagement with said guide slot.

18. The combination as set forth in claim 17 wherein levers are pivotally mounted on said body and are connected between said gripping elements and the opposite ends of said links whereby when said lever arm is swung said links effect swinging of said levers about their pivots.

19. In combination, a swingable lever arm, a gripping mechanism carried by said arm and including gripping means positionable to grip in either direction, said gripping mechanism having a body on which said gripping means are movably mounted, and means for movably connecting said arm to said body of said gripping mechanism and actuated by said arm, the latter upon swinging thereof in one direction relative to said body of said gripping mechanism effecting movement of said gripping means into gripping position in either reversed position of said gripping means.

20. A tong for coupling and uncoupling the tool joints of a drill pipe line comprising a pipe gripping mechanism invertible to grip the drill pipe in either of opposite directions, an elongated horizontal lever arm carrying said pipe gripping mechanism, a horizontally swingable supporting structure swingable in horizontal planes, bearing supports mounted on said supporting structure and to which the latter is pivotally connected, said bearing supports spaced apart longitudinally of said lever arm and rotatably supporting said lever arm near its opposite ends whereby said lever arm may be turned about its longitudinal axis to invert said gripping mechanism, said gripping mechanism being carried by said lever arm outwardly of one of said bearing supports, a releasable locking device for locking said lever arm relative to said supporting structure in either of the inverted positions of said gripping mechanism, and means for swinging said supporting structure horizontally to move said lever arm generally in an endwise direction thereby to move said gripping mechanism toward and from the pipe line.

21. A tong as set forth in claim 20 wherein said horizontally swingable supporting structure comprises spaced apart horizontal link members disposed at the same elevation, said supporting structure being adjustable to locate said link members in parallel relation, said bearing supports being carreid by said link members respectively remote from the pivoted ends of the latter and said link members having said bearing supports pivotally connected to them on parallel vertical axes, and said arms upon horizontal swinging of said supporting structure swinging in horizontal planes about parallel vertical axes.

22. A tong as set forth in claim 20 wherein said pipe gripping mechanism has limited horizontal rocking movement relative to said lever arm into and out of its pipe gripping position, and said supporting structure includes adjustable elements for swinging said lever arm in horizontal planes to effect such rocking movement of said gripping mechanism in either inverted position of the latter.

23. A tong as set forth in claim 21 wherein said gripping mechanism is mounted for rocking movement relative to said lever arm into and out of pipe gripping position and one or both of said link members is adjustable in length to swing said lever arm horizontally to effect such rocking movement of said gripping mechanism in either inverted position of the latter.

24. A tong for coupling and uncoupling the tool joints of a drill pipe line comprising a lever arm, a gripping mechanism carried by said lever arm and relative to which said arm is movable, said gripping mechanism having a frame and pipe gripping elements movably mounted thereon, an operative connection between said lever arm and said frame and actuated by arm movement relative to said frame for effecting movement of said gripping elements relative to said frame either into or out of gripping relation with a drill pipe, and means for swinging said lever arm relative to said frame to effect firm gripping of the pipe by said gripping elements.

25. A tong as set forth in claim 24 wherein said operative connection between said lever arm and said frame is a sliding connection.

26. A tong for coupling or uncoupling the tool joints of a drill pipe line comprising an elongated lever arm, a pipe gripping mechanism comprising a body and gripping jaws movably mounted on said body, said body carried by said lever arm and said lever arm being swingable relative to said body, means for providing limited endwise and swinging movement of said lever arm relative to said body, and operative connections between said lever arm and said jaws for effecting opening and closing of the latter upon endwise movement of said lever arm relative to said body and for further moving said jaws into firm pipe gripping position upon swinging of said lever arm relative to said body.

27. A tong as set forth in claim 26 wherein said operative connections comprise oppositely swingable levers pivotally mounted on said body and operatively connected at their outer ends to said jaws, and toggle links connecting said lever arm to the inner ends of said levers, said endwise movement of said lever arm relative to said body causing said toggle links to swing said levers in opposite directions within certain limtis and swinging of said lever arm relative to said body causing said links further to swing said levers.

28. A tong of the character disclosed comprising, in combination, an elongated lever having swinging movement, a frame having a pivotal mounting on the outer portion of said lever and relative to which said lever has swinging movement, gripping means carried by said frame and movable relative thereto into and out of gripping position, and means operatively connected to said gripping means and to said lever for moving said gripping means relative to said frame upon swinging movement of said lever, said frame and said lever swinging in unison when said gripping means are in gripping position.

29. A tong as set forth in claim 28 wherein means for swinging said lever is provided comprising extensible power devices operatively connected to said lever at points spaced lengthwise of said lever.

30. A tong as set forth in claim 28 wherein said means for operatively connecting said gripping means and said lever include force multiplying means movable relative to said lever and said frame whereby said gripping means is moved into gripping position with a powerful gripping action.

References Cited in the file of this patent

UNITED STATES PATENTS

| | | |
|---|---|---|
| 1,614,328 | Thompson | Jan. 11, 1927 |
| 1,629,895 | Tully | May 24, 1927 |
| 1,812,351 | Marsh | June 30, 1931 |
| 1,906,696 | Lynch | May 2, 1933 |
| 2,450,934 | Calhoun | Oct. 12, 1948 |
| 2,495,834 | Colquitt | Jan. 31, 1950 |
| 2,546,224 | Johansen | Mar. 27, 1951 |
| 2,581,667 | Joy | Jan. 8, 1952 |